No. 638,588. Patented Dec. 5, 1899.
L. DE F. MUNGER.
COMBINED ELASTIC AND PNEUMATIC TIRE.
(Application filed Apr. 25, 1899.)

(No Model.)

Witnesses:
Raphaël Tette
Augustus Less jr

Louis de F. Munger, Inventor
by T. D. Merwin Atty.

UNITED STATES PATENT OFFICE.

LOUIS DE F. MUNGER, OF NEW YORK, N. Y., ASSIGNOR TO THE NATIONAL WHEEL AND TRACTION COMPANY, OF NEW YORK.

COMBINED ELASTIC AND PNEUMATIC TIRE.

SPECIFICATION forming part of Letters Patent No. 638,588, dated December 5, 1899.

Application filed April 25, 1899. Serial No. 714,430. (No model.)

*To all whom it may concern:*

Be it known that I, LOUIS DE F. MUNGER, of the city of New York, borough of Brooklyn, county of Kings, State of New York, have invented a new and useful Elastic and Pneumatic Tire, of which the following is a specification.

My invention relates to improvements in pneumatic or elastic cushion-tires for vehicle-wheels, its object being to provide an improved means of attachment of the tire to the wheel rim or felly and specially designed for the driving-wheels of automobiles.

To this end my invention consists, essentially, in constructing the tire with a metallic base or band permanently secured thereon, as by vulcanizing in the manner hereinafter described and claimed, which serves as the means for attaching the tire to the wheel. Thus the tire-base instead of the tire is directly attached to the wheel, thereby preventing weakening of or injury to the tire by the attaching devices. It has been practically demonstrated that the cement and other means commonly used for attaching pneumatic tires to bicycle-wheels and the like are inefficient for heavy traction-vehicles. It has also been found where fittings for fastening the tire to the wheel-rim have been built into the tire itself that such construction greatly weakens the tire, and the tire being secured only at individual points to the wheel-rim the strain at these points has destructive effect upon the tire.

My invention also comprises such a construction of the felly and tire base that these parts will be practically self-united, exerting but slight strain on the bolts securing the base, and yet that the base and tire can be readily and quickly attached to and detached from the felly without the use of special apparatus and while keeping the tire in a state of inflation.

Figure 1:
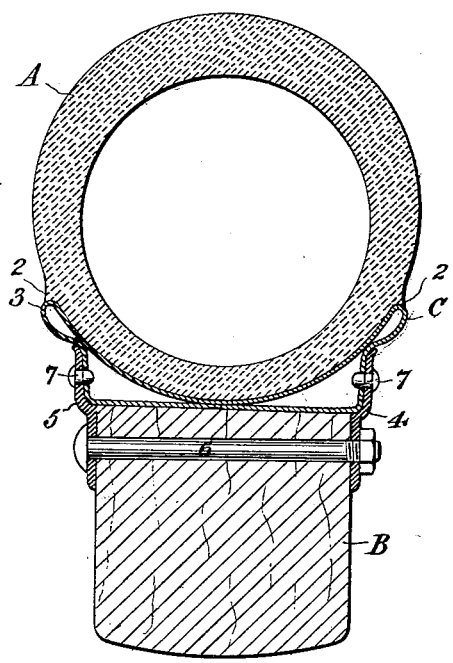
Figure 3:
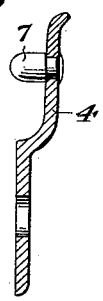
Figure 2:
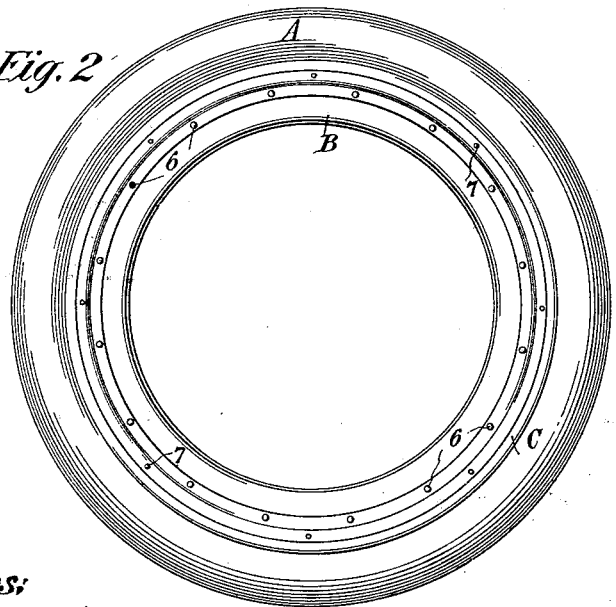

In the accompanying drawings, forming part of this specification, Figure 1 is a cross-section of a tire and a wheel-rim fitted with my improvement. Fig. 2 is a side elevation of a wheel-rim and tire secured thereon by my improvement, and Fig. 3 is a detail of the securing devices.

In the drawings, A represents the tire, B the wheel rim or felly, and C the metallic base of the tire. This base C, as shown, is made, preferably, of an annular metal tube formed by rolls or otherwise, so that its outer surface or periphery conforms to the shape of the inner periphery of the tire and the inner periphery of the tube conforms to the face of the wheel rim or felly to which it is to be attached. The preferred construction of these various parts is illustrated in Fig. 1, the tire being circular in cross-section and the face of the wheel rim or felly being flat. The face of the felly is slightly inclined or at an angle with the axle, the outer diameter of the wheel being the smaller to form a tapering fit for the tire-base to assist in the work of slipping the tire on or off the wheel for the purpose of attachment or detachment, this angle being slight and hardly discernible in the drawings. The outer side of the base is also longer than the other, so as to form an inclined under surface which will conform to the felly and make the tapered fit described.

Owing to the impracticability of making a perfectly circular metallic tire or tire-base that will have a close and perfect fit over a metallic circular felly or rim, it is the usual custom either to cut the tire, so as to make free ends, or to make it in two parts and apply it to the wheel, or to force it thereon under pressure. With metallic bands or tires not so applied great difficulty is acquired in producing a close fit between the parts and in removing the band or tire after it has been placed in position. With the tapered base and felly of my construction in attaching the base to the felly the larger circumference of the base can be easily slipped over the small outer circumference of the felly and forced over the inclined surface of the latter into proper position. When in place, these wedge-shaped surfaces form a close fit and also resist any tendency of further inward movement of the band on the felly, due to strain on the tire in turning corners. By this locking action strain on the securing-bolts of the band will be greatly relieved. In removing the band it is merely necessary to back off the base slightly from the felly, when it can be easily slipped down and off the inclined surface.

In constructing my improvement the tire is vulcanized upon the tire-base, and a shoulder or rib 2 is formed on each side of the tire to rest upon the folded edge 3 of the base, thus furnishing an additional support for the tire and tending to prevent chafing of the same. The rubber at the shoulders is extended down and vulcanized on and over the folded edge of the base to form an elastic edge of the tire at that point, whereby when the tire is subjected to a lateral strain or distortion at that point, as on turning the vehicle a short corner, such strain or distortion is taken up by such elastic joint and strain and tearing or loosening of that portion of the tire vulcanized to the face of the base is entirely prevented.

4 and 5 are annular clamp-rings adapted to be secured upon the opposite sides of the felly and projecting outward to bear upon and engage the tire-base. These clamps are preferably secured in place by means of bolts 6 passing through the felly and the rings. To prevent the tire-base from "creeping" or slipping circumferentially between the clamp-rings, I prefer to provide upon the rings studs or projections 7, which enter corresponding sockets or openings in the tire-base and firmly anchor the latter in place.

It is obvious that various modifications in the form of my improvement may be made without departing from the idea of my invention, which is to provide a metallic base or supporting means secured upon the inner periphery of the tire and as a permanent part thereof and adapted to be detachably connected to the wheel.

Having thus described my invention, I claim—

1. In combination with a pneumatic tire circular in cross-section and a wheel-felly, a base consisting of an annular endless metal rim, its outer face or periphery conforming to the shape of the inner periphery of the tire and the inner periphery of the base conforming to the face of the wheel-felly, means for detachably securing the said base to the tire, the entire surface of the tire that is in contact with base vulcanized thereto, substantially as described.

2. In combination with a pneumatic tire and wheel-felly, a base consisting of an endless detachable annular metal rim, its outer face or periphery conforming to the shape of the inner periphery of the tire and the inner periphery of the base conforming to the face of the wheel-felly, said tire provided on each side with a shoulder and said base provided with opposite folded edges fitting against said shoulders, the shoulders of said tire extending over said folded edges and said tire vulcanized to the base and its folded edges, substantially as described.

3. In combination with a wheel-felly, a pneumatic tire circular in cross-section and provided with shoulders on opposite sides, a base provided with folded edges to fit in and under said shoulders, said tire vulcanized on and over the sides of the folded edges whereby a closed and elastic joint is formed at the junction of said tire and edges, and means to detachably secure said base to said felly, substantially as described.

4. In combination with a tapered felly, a tire, an annular rigid base to which said tire is secured, said base having a tapered under surface and fitted on said felly, substantially as described.

5. In combination, a wheel-felly, a tire of the class described, an annular, sheet-metal tube fitted to and secured upon the inner periphery of said tire and also fitted to the face of said felly, annular clamping-rings fitted to the sides of said felly and provided with suitable securing devices, and means upon said clamping-rings for engaging said base, as and for the purposes specified.

6. In combination, a wheel-felly, a tire of the class described, an annular, metallic tube fitted to, and permanently secured upon, the inner periphery of the tire and also fitted to the face of the felly, the ribs or shoulders upon the tire fitted to, and bearing upon, the folded edges of said tube, the annular clamping-rings fitted to the sides of the felly, the securing devices for attaching the same to the felly, and means for interlocking said clamping-rings with said tube, consisting of projections upon one part entering corresponding sockets or openings in the other, as and for the purposes specified.

Signed at New York city, New York, this 24th day of April, 1899.

LOUIS DE F. MUNGER.

Witnesses:
AUGUSTUS LEE, Jr.,
T. D. MERWIN.